United States Patent [19]

Bunker

[11] 3,724,187

[45] Apr. 3, 1973

[54] ORGANIC DISPOSAL MACHINE

[76] Inventor: Loomis O. Bunker, 4338 Newcomer Road, Kent, Ohio 44240

[22] Filed: Nov. 11, 1971

[21] Appl. No.: 197,805

[52] U.S. Cl.....................................56/361, 239/670
[51] Int. Cl......................A01d 43/02, A01d 87/00
[58] Field of Search......56/344, 361, 364, 13.5, 13.6, 56/13.7, 13.8, 13.9, 14.3, 14.5, 14.6, 14.7, 14.9, 15.7, 15.8, 16.4, 16.6, 16.8; 239/650, 651, 658, 661, 662, 670, 676

[56] References Cited

UNITED STATES PATENTS

| 1,585,243 | 5/1926 | Hanselman | 56/13.3 |
| 2,926,477 | 3/1960 | Bebow | 56/12.9 |
| 3,540,199 | 11/1970 | Lenzer et al. | 56/364 |
| 2,507,669 | 5/1950 | Heth | 56/13.3 |
| 1,824,419 | 9/1931 | Abbe | 239/672 |
| 2,669,078 | 2/1954 | Gregory | 56/13.2 |
| 2,984,061 | 5/1961 | Stabnau | 56/320.1 |
| 3,420,452 | 1/1969 | Vaughan | 239/670 |
| 3,412,943 | 11/1968 | Lewis et al. | 239/651 |
| 3,322,429 | 5/1967 | Cerrelli | 239/670 |
| 2,641,097 | 6/1953 | Mast | 56/1 |

FOREIGN PATENTS OR APPLICATIONS

| 111,117 | 6/1967 | Norway | 56/13.9 |
| 1,206,191 | 12/1965 | Germany | 56/344 |
| 1,522,077 | 3/1968 | France | 56/344 |

Primary Examiner—Russell R. Kinsey
Attorney—Vern L. Oldham et al.

[57] ABSTRACT

A self-contained machine for gathering organic materials such as leaves or grass clippings from the ground, pulverizing such materials and mixing them with water to form a slurry and dispensing the slurry as a fertilizer. A method for disposing of such organic materials is also disclosed.

9 Claims, 6 Drawing Figures

PATENTED APR 3 1973  3,724,187
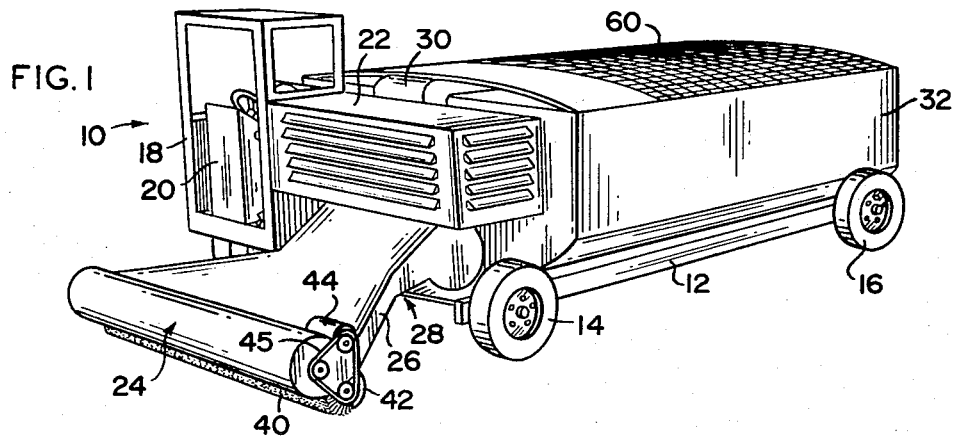
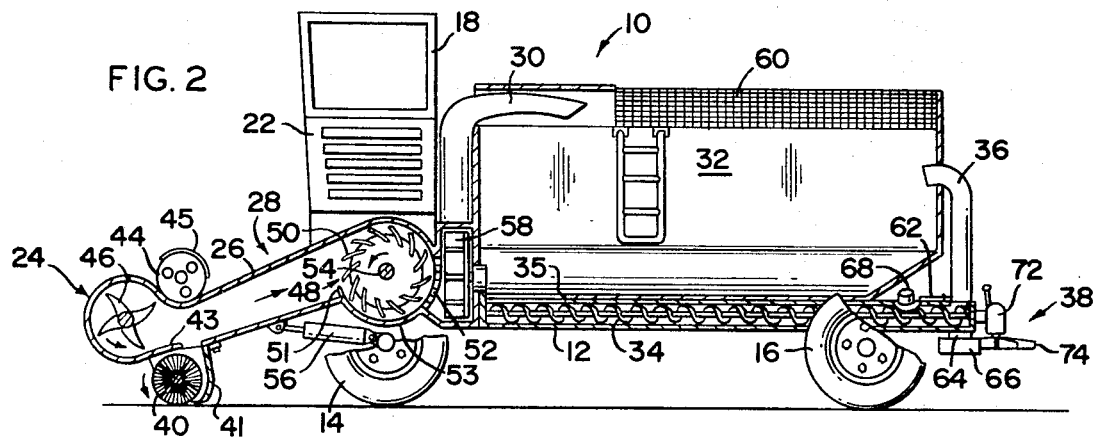
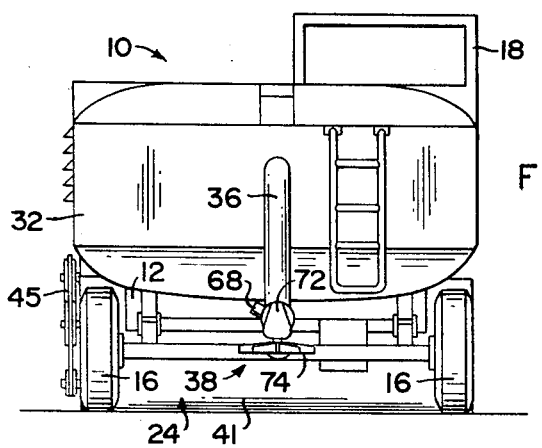
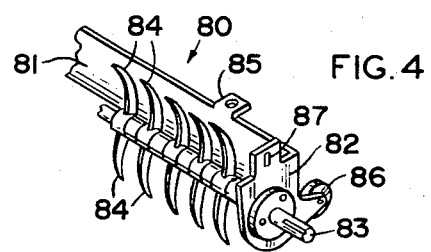
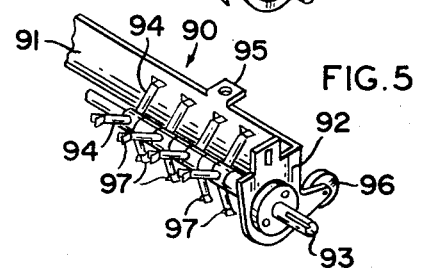
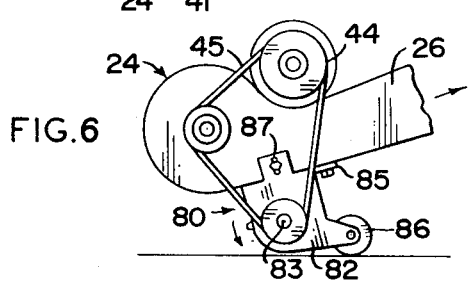
INVENTOR.
LOOMIS O. BUNKER
BY
Oldham & Oldham
ATTORNEYS.

ORGANIC DISPOSAL MACHINE

The removal of organic materials such as leaves, grass clippings, small twigs, and the like from lawns, parks, and other areas presents a number of problems. Means must be provided for gathering the materials, transporting them, and ultimately disposing of them. At the present time, each of these steps is normally performed separately and in an inefficient manner. Normally the debris is removed from the lawn or the like by hand raking or by the use of sweepers. When the leaves or other debris have been collected it is then loaded into carts or trucks to be transported for disposal. Common methods for disposal include burning and piling to form compost. Burning is highly undesirable as it destroys valuable plant nutrients in the debris and contributes substantially to air pollution. When large quantities of leaves or other debris are being disposed of a considerable area is necessary for composting operations. Also, a long period of time is necessary to convert the debris into usable compost, especially when the debris contains materials such as twigs and branches, and, when the compost has formed, it must be transported and spread onto the ground.

It is the primary object of the present invention to provide apparatus and a method for disposing of leaves, grass and other debris which is highly efficient, eliminating the large number of separate handling operations heretofore required.

It is also an object of the invention to provide apparatus in the form of a self-contained unit for gathering leaves or other debris, converting this debris into a usable form, and transporting and spreading the processed material.

Another object of the invention is the provision of a method for handling and disposing of organic debris which converts the debris into a fertilizer which may be spread onto fields.

Yet another object of the invention is the provision of a method and apparatus for gathering debris from parks, lawns and the like, converting the debris into organic fertilizer, hauling the debris from the gathering site, and spreading the converted debris onto fields.

The above and other objects of the invention which will become apparent in the following detailed description are achieved by providing apparatus which consists, essentially, of leaf and debris gathering means, a pulverizing device receiving the gathering materials, a storage tank for the pulverized materials, an auger extending along the lower end of the storage tank for conveying the pulverized materials rearwardly, a first opening at the rear end of the conveyor connected to a return pipe for recycling the pulverized materials into the tank, means to introduce water and/or other liquids to the pulverized material moving through the conveyor, a second opening at the rear end of the conveyor for discharging the material to a spreader member and gate means for selectively opening either of the discharge openings.

For a more complete understanding of the invention and the objects and advantages thereof, reference should be had to the following detailed description and the accompanying drawings wherein there is shown a preferred embodiment of the invention.

In the drawings:

FIG. 1 is a perspective left front view of the disposal machine of the present invention;

FIG. 2 is a left side elevational view, partially in section, of the machine of FIG. 1;

FIG. 3 is a rear elevational view of the machine of FIG. 1;

FIG. 4 is a fragmentary perspective view of a dethatching assembly which may be used in place of the cylindrical brush of FIG. 1;

FIG. 5 is a fragmentary perspective view of a flail mower assembly which may be used in place of the cylindrical brush of FIG. 1; and FIG. 6 is a fragmentary side elevational view showing how the assembly of FIG. 4 or that of FIG. 5 is mounted to the disposal machine of the present invention.

Referring now to the drawings, the organic disposal machine is designated generally by the reference numeral 10. This machine has a frame 12, front and rear wheels 14 and 16, respectively, an operator's cab 18 which houses the controls 20, and an enclosure 22 which houses the drive motor for the machine 10. The enclosure 22 may also house various driving and controlling means for the debris pulverizing equipment described below. Such control means are operable from or provided in the operator's cab 18.

Mounted to the forward end of the frame and projecting in front of the machine 10 is a leaf or debris gathering device 24 which gathers the debris from the ground and sends it rearwardly through a duct 26 to a pulverizer 28. From the pulverizer 28 the debris travels via a second duct 30 to a storage tank 32. An auger type conveyor 34 is provided in the bottom of the tank 32 and projects rearwardly. As will be described in more detail below, the conveyor 34 moves the material in the tank 32 rearwardly either recycling the material through a return duct 36 or discharging it through a spreader wheel assembly, or similar means 38.

The various components of the machine 10 are illustrated in greater detail in FIG. 2. The debris pick up mechanism 24 includes a long cylindrical brush 40 which is journaled on end plates 42 and driven by a drive belt 45 from a motor 44, preferably a hydraulic motor. The brush 40 is rotated as indicated by the arrow to take debris such as leaves from the ground and move it upwardly in combination with a rear cover or enclosing plate 41 to the duct 26. A top cover plate 43 is immediately adjacent the brush at one portion of its periphery and serves to remove the debris which sticks to the brush 40. The rear cover plate 41 is either constructed af a flexible material or is flexibly mounted to the assembly 24 so that this plate does not become damaged by striking against any surface irregularities as its lower end is adjacent the ground surface. The debris pick up assembly 24 also includes a blower fan 46 which may also be driven by the motor 44 by belt 45. This fan 46 is constructed to create an air current in the duct 26 to move the leaves or other debris upwardly and rearwardly toward the pulverizer 28.

The pulverizer 28 includes a drum 48 which rotates as indicated by the arrow in FIG. 2 and which is provided on its circumferential periphery with a plurality of blades 50. A stationary blade 51 is provided in the entry side of the pulverizer 28 and serves in conjunction with the rotating blades 50 to cut or chop the incoming debris. Additional stationary blades 52 are also provided. These additional stationary blades 52 are located at the exit side of the pulverizer 28 and serve, in conjunction with the rotating blades 50, to further chop or pulverize the debris being processed. The drum 48 is suitably journaled on the frame 12 and any suitable power take off means or other drive member (not shown) connects to the drum shaft 54 to drive the same.

Preferably, the debris gathering mechanism 24 and the duct 26 are pivotally connected to the frame 12 about the shaft 54 of the pulverizer drum 48. A hydraulic cylinder 56 is connected between the duct 26 and the frame 12 to permit the duct 26 and debris pick up mechanism 24 to be controllably raised and lowered.

At the outlet side of the pulverizer 28 there is provided a second fan or blower 58 which communicates with the second duct 30 to move the pulverized material passing over the blades 52 upwardly through the second duct 30 and into the storage tank 32. A portion of the tank 32 may have a fine mesh or screen covering 60 to permit the air from the second fan 58 to escape while retaining the pulverized material in the tank 32. The remainder of the tank is fully enclosed.

The blower 58 has its axis at right angles to the axis of the drum 48 to receive the cut-up or pulverized debris and change its direction of movement. A cover or guide plate means 53 leads the air-debris mix to the inlet of the blower 58. Any suitable power means drives the fan or blower 58.

The auger type conveyor 34 has an opening 35 communicating with the interior of the tank 32 and extends the full length of the tank 32 to a point rearwardly of the tank where the conveyor tube is provided with a pair of gates 62 and 64, the first gate 62 communicating with a return duct 36 which leads back to the tank 32. The second gate 64 communicates with the discharge tray 66 associated with the spreader mechanism 38. Adjacent the gates 62 and 64 there is provided an inlet 68 to the conveyor tube. This inlet 68 permits water, liquid fertilizer, or other materials to be introduced into the conveyor tube when desired.

The spreader mechanism 38 includes a spreader wheel 74 which is driven through a clutch and gear box 72 from the shaft of the auger 34. Other spreader means such as spray nozzles or other suitable outlets could be used if desired. The spreader wheel 74 receives material from the discharge tray 66 and distributes this material in a fan-like pattern behind the machine 10. The auger 34 is suitably driven as by a controlled drive connection to a power take off unit of the prime move for the machine 10. The auger 34 would normally be driven at high speed when the debris and liquid is to be forced up into and through the duct 36 and at a slow speed when material is being discharged. While, in the embodiment described, the material is forced through the return duct 36 by the action of the horizontal auger 34, it will be understood that a vertically extending auger or other conveying means may be provided in the return duct 36 to assist in returning the processed material to the tank 32.

In operation, the motor 44 of the debris pick up mechanism 24 is operated to rotate the brush 40 and blower fan 46 so that leaves or other debris are swept from the ground surface and moved rearwardly through the duct 26 to the pulverizer 28. The pulverizer drum 48 is also rotating at this time so that the material is chopped or pulverized by the actions of the rotating blades 50 and the stationary blades 51 and 52. The second blower fan 58 also operates to move the pulverized material through the duct 30 into the tank 32. During this operation the machine 10 is propelled along the ground by means of the motor in the enclosure 22, and the operator guiding the machine to clean the desired area. When the tank 32 has become fully or substantially filled with the chopped or pulverized debris the auger 34 is operated at high speed with the gate 62 in its open position and the gate 64 in its closed position thus recirculating the debris by way of the return duct 36. The clutch 72 is disengaged at this time so that the spreader assembly 38 is not operating. Water or other liquid may now be introduced into the rear of the conveyor tube through the inlet 68. The action of the conveyor in moving the debris rearwardly serves to further pulverize the debris and the introduction of water or other liquid through the inlet 68 serves to make a slurry from the pulverized debris. This operation is continued with the debris and water mixture being recirculated into the tank 32 through the return duct 36 until all of the material in converted into the slurry. The material in slurry form occupies considerably less volume in the tank 32 and additional dry pulverized debris may be added to the tank and subsequently converted into or mixed with the slurry. When the tank 32 has accumulated a full load of pulverized debris or slurry, the machine 10 travels to a field or other area where it is desired to spread the pulverized material. Spreading is accomplished by operating the auger at a controlled slow rate of speed with the gate 62 closed and the gate 64 open while also operating the spreader mechanism 38 so that the pulverized slurry material is conveyed to the discharge tray 66 and then spread across the field by the action of the rotating spreader blade 74. Or, of course, the pulverized leaves, etc. can be directly distributed by the spreader 74 after the desired liquid is added at the tube 68.

For clarity, pressure supply lines as for the motor 44 are not shown in the drawings as any suitable or known drive means may be provided for the various driven components of the machine 10. The invention also contemplates the use of devices other than the cylindrical brush 40 for picking up debris from the ground. For example, the dethatching assembly 80 of FIG. 4 or the flail mower assembly 90 of FIG. 5 may be used. Of course, caterpiller treads or tracks may be used for vehicle support and/or drive. Any desired liquids, herbicides, etc. may be added to the material for redeposit thereof by the apparatus disclosed.

The dethatcher assembly 80 has a frame plate 81 and end plate 82. A shaft 83 is journalled in the end plates 82 and extends the length of the assembly. Dethatcher tines 84 are carried by and rotate with the shaft 83. These tines are designed to penetrate the surface of sod to lift and remove the layer of matted grass and debris which has accumulated. The frame plate 81 also serves as a cover plate for the tines 84 and thus directs the debris upwardly toward the feed chute 26. Mounting lugs 85 may be provided on the frame plate 81 for securing the assembly to the machine 10. Also, wheels 86 may be provided to limit the amount of penetration of the tines 84 into the turf.

Another unit which may be used in place of the brush 40 is the flail mower assembly 90 illustrated in FIG. 5.

This assembly has a frame plate 91, end plates 92, a shaft 93 journalled in the end plates 92, and a plurality of flails 94 connected to and rotating with the shaft 93. Each of the flails 94 preferably has a fiburcated outer end portion 97 which, when the flail is rotating, will cut the grass, weeds, brush, or the like passing beneath the assembly 90. The frame plate 91 serves also as a cover plate to direct the cut material upwardly into the airstream in the chute 26 for movement to the pulverizer and storage facilities of the machine 10. Mounting lugs 95 are provided on the upper edge of the plate 91 and wheels 96 regulate the height of the flail blades from the ground.

As will be seen from FIG. 6, the dethatcher assembly 80 is mounted to the forward end of the chute 26 in place of the cylindrical brush 40. The flail mower assembly 90 would be mounted in the same manner. The frame plate 81 is fastened to the bottom wall of the chute 26 by bolts passing through the lugs 85. Additional anchoring of the assembly 80 is provided by bolts which extend through openings 87 in the end plates 82 and engage the side walls of the chute 26. The shaft 83 is provided with a pulley for receiving the belt 45. Thus, the motor 44 serves to drive the shaft 83 and the tines 84. As was mentioned above, the wheels 86 determine the vertical position of the assembly 80 and, hence, the amount of penetration of the tines 84. Although not shown in the drawings, the wheels 86 are preferably vertically adjustable.

It should now be apparent that the disposal machine of the present invention provides an efficient method for handling leaves, grass and other debris. The machine is capable of clearing such debris from large areas in a short period of time. Since the debris is pulverized and processed into a slurry in the same machine which is used to gather it from the ground, only a minimum of handling is necessary. Further, the machine of the present invention converts the organic debris into a valuable fertilizer product.

The brush 40 or equivalent member is journaled on the end plates 42 which are suitable supported on and are carried by the pivotally positioned duct means 26.

It should be understood that while only the best known embodiment of the invention has been illustrated and described in detail herein, the invention is not limited thereto or thereby. Reference should therefore be had to the appended claims in determining the true scope of the invention.

I claim:

1. Apparatus for disposing of organic debris such as leaves, grass clippings, and the like, comprising:
   a vehicle having a frame, ground-engaging support means, and means on the vehicle for driving the support means operatively connected thereto;
   rotatable debris collecting means mounted on the vehicle and extending forwardly thereof to move the debris rearwardly of the vehicle;
   a pulverizer mounted on the vehicle adjacent the debris collecting means and receiving debris from the collecting means, the pulverizer discharging debris therefrom;
   a storage tank mounted on the vehicle frame;
   means on the vehicle to receive pulverized debris from the pulverizer and move it to the storage tank;
   axially extending conveying means at the bottom of the storage tank receiving pulverized debris from the storage tank and conveying such debris to the rear end of the vehicle;
   an upwardly extending duct at the discharge end of the conveying means connecting to the interior of the storage tank;
   a spreader mechanism adjacent and below the discharge end of the conveying means to receive material therefrom; and
   gate means operatively connected to the conveying means for selectively directing the pulverized debris from the conveying means to either the duct or the spreader mechanism.

2. Apparatus according to claim 1 wherein the debris collecting means comprises a cylindrical brush extending transversely in front of the vehicle, means for rotating the brush, and duct means extending from the brush to the pulverizer.

3. Apparatus according to claim 2 further including a blower mounted adjacent to the brush and adapted to direct an air stream through the duct means to move debris toward the pulverizer.

4. Apparatus according to claim 2 wherein the duct means is pivotally connected to the vehicle about horizontal axis at the rear end of the duct means and further including means to controllably pivot the duct means about the axis whereby the height of the brush from the ground surface may be varied.

5. Apparatus according to claim 1 wherein the means to move the pulverized debris comprises a blower and a second duct.

6. Apparatus according to claim 1 wherein the conveying means comprises an auger type conveyor extending along the lower surface of the storage tank in communication with the interior thereof to a point rearwardly of the storage tank.

7. Apparatus according to claim 6 further including inlet means on the conveyor means adjacent the rear end thereof for supplying liquid to the debris carried by the conveyor.

8. Apparatus for picking up and disposing of organic debris such as leaves, grass clippings, and the like, comprising:
   a vehicle having a frame, ground-engaging support means, and means on the vehicle for driving the support means operatively connected thereto;
   rotatable debris collecting means mounted on the vehicle and positioned to pick up debris and move it toward the vehicle;
   a pulverizer mounted on the vehicle adjacent the debris collecting means and receiving debris from the collecting means, the pulverizer discharging debris therefrom in a controlled path;
   a storage tank mounted on the vehicle;
   blower and duct means on the vehicle to receive the pulverized debris from the pulverizer and move it to and discharge it in the storage tank;
   axially extending conveying means at the bottom of the storage tank receiving pulverized debris from the storage tank and conveying such debris to the rear end of the vehicle;
   a spreader mechanism adjacent and below the discharge end of the conveying means to receive material therefrom; and an inlet means operatively connecting to the conveying means adjacent the rear end of the vehicle to provide for supply of liquid to the debris before it is moved to the spreader mechanism.

9. Apparatus as in claim 8 and comprising blower means operatively connected to the debris collecting means to aid in moving the debris to the pulverizer.

* * * * *